(12) United States Patent
Hehenberger

(10) Patent No.: US 8,790,203 B2
(45) Date of Patent: Jul. 29, 2014

(54) DIFFERENTIAL GEARING FOR AN ENERGY GENERATION PLANT AND OPERATING METHOD

(76) Inventor: Gerald Hehenberger, Klagenfurt (AT)

( * ) Notice: Subject to any disclaimer, the term of this patent is extended or adjusted under 35 U.S.C. 154(b) by 247 days.

(21) Appl. No.: 13/381,751

(22) PCT Filed: Jun. 17, 2010

(86) PCT No.: PCT/AT2010/000225
§ 371 (c)(1),
(2), (4) Date: Dec. 30, 2011

(87) PCT Pub. No.: WO2011/000008
PCT Pub. Date: Jan. 6, 2011

(65) Prior Publication Data
US 2012/0115661 A1    May 10, 2012

(30) Foreign Application Priority Data

Jul. 2, 2009   (AT) ................................ A 1035/2009

(51) Int. Cl.
*F16H 3/72*       (2006.01)
*F16H 37/06*     (2006.01)
*B60K 6/445*     (2007.10)

(52) U.S. Cl.
USPC ............................. 475/5; 475/4; 180/65.235

(58) Field of Classification Search
CPC ..... F03D 11/02; F03D 11/026; Y02E 10/722;
F16H 51/00; F16H 48/11; F16H 2037/0866;
F16H 48/22; F16H 3/724
USPC .................................... 475/1–10; 180/65.235
See application file for complete search history.

(56) References Cited

U.S. PATENT DOCUMENTS

| | | | |
|---|---|---|---|
| 5,577,423 A | 11/1996 | Mimura | |
| 7,560,824 B2 * | 7/2009 | Hehenberger | 290/44 |
| 7,816,798 B2 * | 10/2010 | Hehenberger | 290/44 |
| 2002/0002097 A1 * | 1/2002 | Paalasmaa et al. | 475/323 |
| 2008/0054643 A1 | 3/2008 | Nitzpon et al. | |
| 2011/0206517 A1 * | 8/2011 | Antonov et al. | 416/170 R |

FOREIGN PATENT DOCUMENTS

| | | |
|---|---|---|
| CN | 1130577 A | 9/1996 |
| CN | 101029628 A | 9/2007 |
| DE | 10 2006 006 327 | 8/2007 |
| EP | 1 283 359 | 2/2003 |
| EP | 1 314 884 | 5/2003 |
| GB | 2 206 930 | 1/1989 |
| GB | 2 429 342 | 2/2007 |
| JP | 2004239113 A | 8/2004 |

(Continued)

OTHER PUBLICATIONS

International Search Report dated Oct. 22, 2010, corresponding to PCT/AT2010/000225.

(Continued)

*Primary Examiner* — Tisha Lewis
(74) *Attorney, Agent, or Firm* — Young & Thompson

(57) ABSTRACT

A differential gearing for an energy generation plant, in particular for a wind power station, has three drives and outputs, a first drive being connected to a drive shaft of the energy generation plant, one output being connected to a generator (8), and a second drive being connected to an electrical machine as differential drive (6). The transmission ratio of the differential gearing (3) can be fixed at 1 by way of a brake (20).

19 Claims, 4 Drawing Sheets

(56) References Cited

FOREIGN PATENT DOCUMENTS

| | | |
|---|---|---|
| JP | 2004 339953 | 12/2004 |
| JP | 2007 040239 | 2/2007 |
| WO | 2004/109157 | 12/2004 |
| WO | 2006/010190 | 2/2006 |
| WO | 2008/061263 | 5/2008 |
| WO | 2008149109 A1 | 12/2008 |
| WO | 2009/016508 | 2/2009 |
| WO | WO 2009016508 A2 * | 2/2009 |
| WO | WO 2010085987 A2 * | 8/2010 |

OTHER PUBLICATIONS

Austrian Search Report dated May 28, 2010, corresponding to Foreign Priority Application No. A 1035/2009.
Translation of Chinese Office Action, dated Nov. 7, 2013, from corresponding CN application.

* cited by examiner

DIFFERENTIAL GEARING FOR AN ENERGY GENERATION PLANT AND OPERATING METHOD

BACKGROUND OF THE INVENTION

1. Field of the Invention

The invention relates to differential gearing for an energy generation plant, in particular for a wind power station, with three drives and outputs, a first drive being connected to a drive shaft of the energy generation plant, one output being connected to a generator that can be connected to a grid, and a second drive being connected to an electrical machine as a differential drive.

The invention furthermore relates to a method for operating differential gearing for an energy generation plant, in particular for a wind power station, with three drives and outputs, a first drive being connected to a drive shaft of the energy generation plant, one output being connected to a generator that can be connected to a grid, and a second drive being connected to an electrical machine as a differential drive.

2. Description of the Related Art

Wind power stations are becoming increasingly important as electrical generating plants. For this reason, the percentage of power generation by wind is continuously increasing. This in turn dictates, on the one hand, new standards with respect to current quality, and, on the other hand, a trend toward still larger wind power stations. At the same time, a trend is recognizable toward offshore wind power stations that requires station sizes of at least 5 MW installed power. Due to the high costs for infrastructure and maintenance or servicing of wind power stations in the offshore region, here, both efficiency and also the availability of the stations acquire special importance.

The necessity of a variable rotor speed is common to all plants, on the one hand, for increasing the aerodynamic efficiency in the partial load range, and, on the other hand, for controlling the torque in the drive line of the wind power station, the latter for purposes of speed control of the rotor in combination with rotor blade adjustment. Currently, for the most part, wind power stations are used that meet this requirement by using variable-speed generator designs in the form of so-called double-supplied three-phase machines or synchronous generators in concert with frequency converters. These designs, however, have the disadvantage that (a) the electrical behavior of the wind power stations in the case of a grid problem only conditionally meets the requirements of the electricity supply company, (b) the wind power stations can only be connected to the medium voltage grid by means of a transformer station, and (c) the frequency converters necessary for the variable speed are very powerful and therefore a source of efficiency losses.

These problems can be solved by using separately excited medium voltage synchronous generators. Here, however, alternative designs are needed to meet the requirement for variable rotor speed or torque control in the drive line of the wind power station. One possibility is the use of differential gearing that allows a variable speed of the rotor of the wind power station by changing the transmission ratio at constant generator speed.

WO2004/109157 A1 shows a complex, hydrostatic "multipath" concept with several parallel differential stages and several switchable clutches, as a result of which it is possible to switch between the individual paths. With the illustrated technical design, the power and thus the losses of the hydrostatics can be reduced. One major disadvantage is, however, the complex structure of the entire unit. Moreover, the switching between the individual stages constitutes a problem in the control of the wind power station.

EP 1283359 A1 shows 1-stage differential gearing with an electrical differential drive, with a special three-phase machine that is positioned coaxially around the input shaft, with low nominal speed and high nominal output—relative to the implemented speed range.

The disadvantages of known embodiments are, on the one hand, high losses in the differential drive, and, on the other hand, for concepts that solve this problem, complex mechanisms or special electrical machine construction and thus high costs. In hydrostatic designs, moreover, the service life of the pumps used is a problem, and high cost is necessary when adapted to extreme environmental conditions. In general, it can be maintained that the chosen nominal speed ranges are either too small for the correction of extreme loads or too large for optimum energy yield of the wind power station.

BRIEF SUMMARY OF THE INVENTION

The object of the invention is to largely avoid the aforementioned disadvantages and to make available a differential drive that in addition to the lowest possible costs also ensures both maximum energy yield and also optimum control of the wind power station.

This object is achieved with differential gearing with the features of the claims.

This object is furthermore achieved with a method with the features set forth in the claims.

Preferred embodiments of the invention are the subject matter of the dependent claims.

By fixing the transmission ratio of the differential gearing, for low flow velocities, the speed range of the rotor of the energy generation plant is essentially widened downward, since the differential drive as sole generator remains connected to the grid (the main generator is disconnected from the grid), thus allows lower speeds, and thus the annual energy yield of the energy generation plant is raised accordingly.

BRIEF DESCRIPTION OF THE DRAWINGS

Preferred embodiments of the invention are described in detail below with reference to the attached drawings.

For a 5 MW wind power station according to the state of the art.

DETAILED DESCRIPTION OF THE PREFERRED EMBODIMENTS

The output of the rotor of a wind power station is computed from the formula rotor output=rotor area*power coefficient*air density/2*wind speed$^3$ the power coefficient being dependent on the tip speed ratio (=ratio of blade tip speed to wind speed) of the rotor of the wind power station. The rotor of a wind power station is designed for an optimum power coefficient based on a tip speed ratio that is to be established in the course of development (generally a value of between 7 and 9). For this reason, in the operation of the wind power station in the partial load range, a correspondingly low speed can be set to ensure optimum aerodynamic efficiency.

Figure 1:
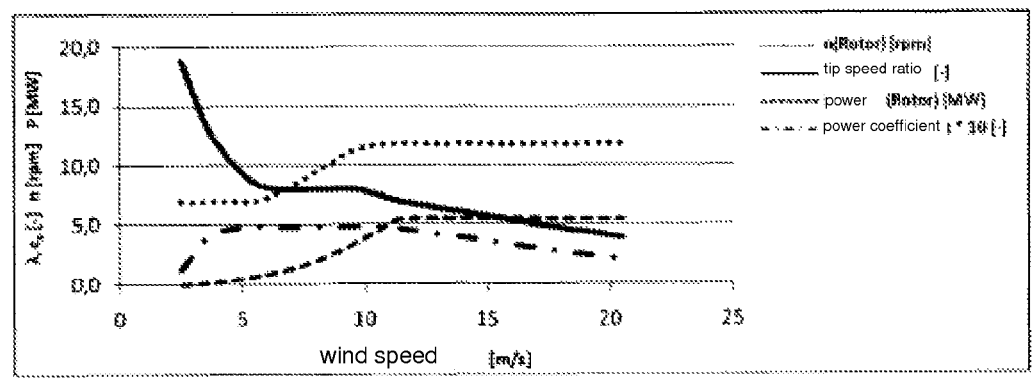
FIG. 1 shows the power curve, the rotor speed, and the resulting characteristics such as the tip speed ratio and the power coefficient.

FIG. 1 shows the ratios for rotor output, rotor speed, tip speed ratio and power coefficient for a given maximum speed range of the rotor and an optimum tip speed ratio of 8.0-8.5. It is apparent from the diagram that as soon as the tip speed ratio deviates from its optimum value of 8.0-8.5, the power coefficient drops, and thus according to the aforementioned formula, the rotor output is reduced according to the aerodynamic characteristic of the rotor.

Figure 2:
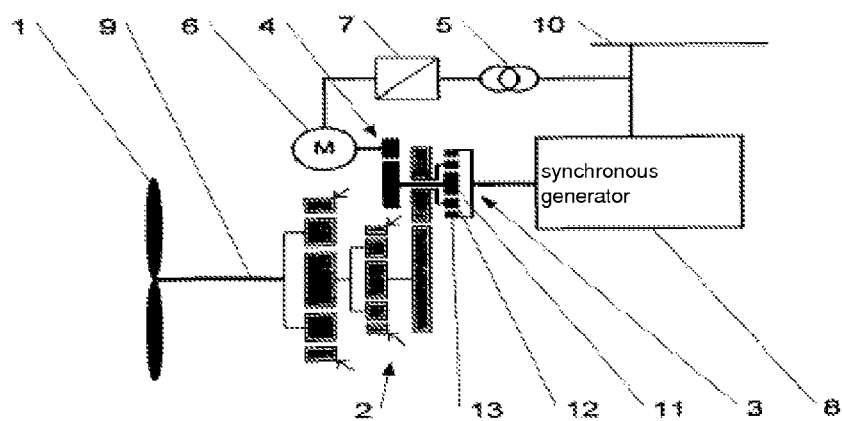
FIG. 2 shows the principle of differential gearing with an electrical differential drive according to the state of the art.

FIG. 2 shows one possible principle of a differential system for a wind power station consisting of differential stages 3 and 11 to 13, a matching gearing stage 4, and a differential drive 6. The rotor 1 of the wind power station that sits on the drive shaft 9 for the main gearing 2 drives the main gearing 2. The main gearing 2 is 3-stage gearing with two planetary gear stages and one spur gear stage. Between the main gearing 2 and the generator 8, there is a differential stage 3 that is driven by the main gearing 2 via planetary gear carriers 12 of the differential stage 3. The generator 8—preferably a separately excited synchronous generator that if necessary can also have a nominal voltage of greater than 20 kV—is connected to the ring gear 13 of the differential stage 3 and is driven by it. The pinion 11 of the differential stage 3 is connected to the differential drive 6. The speed of the differential drive 6 is controlled in order, on the one hand, at variable speed of the rotor 1 to ensure a constant speed of the generator 8 and, on the other hand, to control the torque in the complete drive line of the wind power station. In order to increase the input speed for the differential drive 6, in the illustrated case, 2-stage differential gearing is chosen that calls for a matching gearing stage 4 in the form of a spur gear stage between the differential stage 3 and differential drive 6. The differential stage 3 and matching gearing stage 4 thus form the 2-stage differential gearing. The differential drive is a three-phase machine that is connected to the grid 10 via frequency converter 7 and transformer 5.

Figure 3:
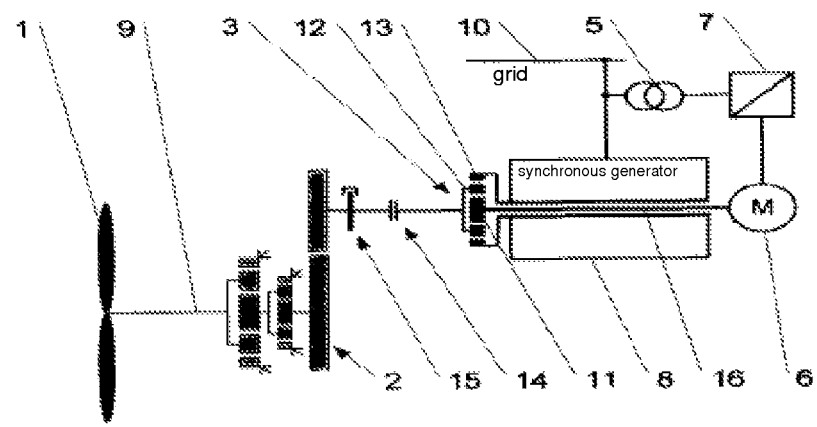
FIG. 3 shows the principle of a three-phase machine that is aligned coaxially to the input shaft of the differential stage.

FIG. 3 shows another possible embodiment of the differential gearing. The rotor 1 drives the main gearing 2, and the latter drives the differential stage 11 to 13 via planetary gear carriers 12. The generator 8 is connected to the ring gear 13, and the pinion 11 is connected to the differential drive 6. The differential gearing 3 is 1-stage, and the differential drive 6 is in a coaxial arrangement both to the output shaft of the main gearing 2 and also to the drive shaft of the generator 8. For the generator 8, there is a hollow shaft that allows the differential drive 6 to be positioned on the side of the generator 8 that is facing away from the differential gearing. In this way, the differential stage is preferably a separate assembly that is linked to the generator 8 and that is then connected to the main gearing 2 preferably via a coupling 14 and a main brake 15. The connecting shaft 16 between the pinion 11 and the differential drive 6 can preferably be made in a torsionally-stiff variant embodiment that has especially little mass moment of inertia, such as, for example, a fiber composite pipe shaft with glass fibers and/or carbon fibers.

The speed equation for the differential gearing reads:

speed$_{Generator}$=x*speed$_{Rotor}$+y*speed$_{Differential\ drive}$ the generator speed being constant, and the factors x and y can be derived from the selected gearing transmission ratios of the main gearing and differential gearing. The torque on the rotor is determined by the prevailing wind supply and the aerodynamic efficiency of the rotor. The ratio between the torque on the rotor shaft and that on the differential drive is constant, as a result of which the torque in the drive line can be controlled by the differential drive. The torque equation for the differential drive reads:

torque$_{Differential\ drive}$=torque$_{Rotor}$*y/x, the size factor y/x being a measure of the necessary design torque of the differential drive.

The output of the differential drive is essentially proportional to the product of the percentage deviation of the rotor speed from its base speed (rotor speed at which the differential drive has a speed equal to 0) times the rotor output. Accordingly, a large speed range requires essentially correspondingly large dimensioning of the differential drive.

Figure 4:
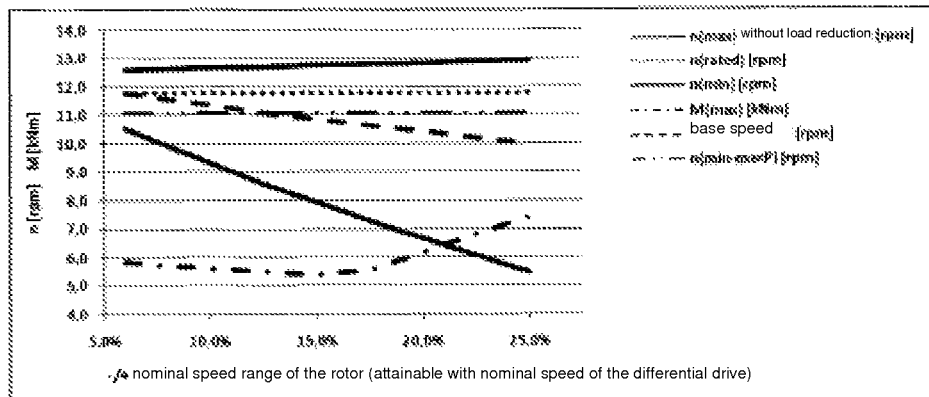
FIG. 4 shows the speed ratios on the rotor of the wind power station and the resulting maximum input torques $M_{max}$ for the differential drive, By way of example.

By way of example, FIG. 4 shows this for various speed ranges. The −/+ nominal speed range of the rotor defines its percentage speed deviation from the base speed of the rotor that with the nominal speed of the differential drive (− . . . as motor and + . . . as generator) can be accomplished without field attenuation. The nominal speed (n) of the differential drive in the case of an electrical three-phase machine defines that maximum speed at which it can continuously deliver the nominal torque ($M_n$) or the nominal output ($P_n$).

In the nominal output range, the rotor of the wind power station turns with an average speed $n_{rated}$ between the limits $n_{max}$ and $n_{min-maxP}$ in the partial load range between $n_{rated}$ and $n_{min}$, in this example attainable with a field attenuation range of 80% (this corresponds to a maximum speed of the differential drive of 1.8 times nominal speed). The control speed range between $n_{max}$ and $n_{min-maxP}$ that can be accomplished without load reduction is chosen to be correspondingly large in order to be able to compensate for wind gusts. The size of this speed range depends on the gustiness of the wind and the mass inertia of the rotor of the wind power station and the dynamics of the so-called pitch system (rotor blade adjustment system) and is conventionally approximately −/+5%. In the illustrated example, a control speed range of −/+6% was chosen to have corresponding reserves for the compensation for extreme gusts using differential drives. In this control speed range, the wind power station must produce nominal output; this means that the differential drive is loaded here with maximum torque. This means that the −/+ nominal speed range of the rotor must be roughly the same since only in this range can the differential drive deliver its nominal torque.

In electrical and hydrostatic differential drives with a differential stage, the rotor speed at which the differential drive has speed equal to 0 is called the base speed. Since at this point for small rotor speed ranges the base speed is above $n_{min-maxP}$, the differential drive must be able to deliver the nominal torque at a speed equal to 0. Differential drives, however, whether electrical or else hydraulic, for speed equal to zero, can only produce a torque that is distinctly below the nominal torque; this, however, can be compensated by a corresponding overdimensioning in the design. Accordingly, for this sample embodiment, there is a minimum nominal speed range of roughly −/+14% that is optimum in this sense.

Figure 5:
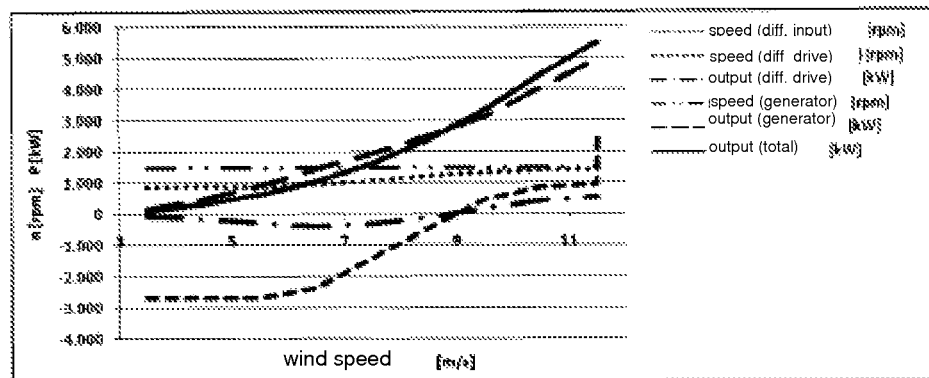
FIG. 5 shows the speed and power ratios of an electric differential drive over wind speed.

By way of example, FIG. 5 shows the speed or power ratios for a differential stage with a nominal speed range of −/+14%. The speed of the generator, preferably a separately excited medium voltage synchronous generator, is constant due to the connection to the frequency-fixed power grid. In order to be able to use the differential drive correspondingly well, this drive is operated as a motor in the range smaller than the base speed and as a generator in the range greater than the base speed. This leads to the power being fed into the differential stage in the motor range and the power being taken from the differential stage in the generator range. In the case of an electrical differential drive, this power is preferably taken from the grid or is fed into it. In the case of a hydraulic differential drive, the power is preferably taken from the generator drive shaft or supplied to it. The sum of the generator power and the power of the differential drive yields the total power delivered into the grid for an electrical differential drive.

Figure 6:
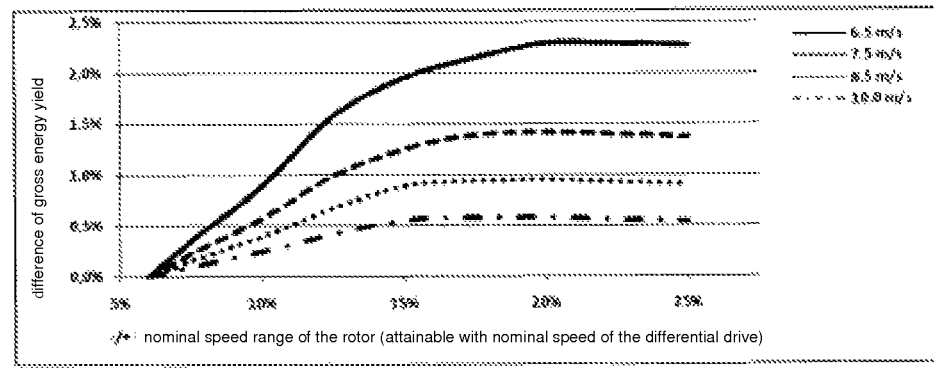
FIG. 6 shows the difference of the gross energy yield for various nominal speed ranges at different average annual wind speeds for an electrical differential drive with 80% field attenuation range.

FIG. 6 shows the difference of the gross energy yield of the wind power station with electrical differential drive at different average annual wind speeds depending on the nominal speed range of the rotor of the wind power station. Here, the gross energy yield is based on the output power of the rotor of the wind power station minus the losses of the differential drive (incl. frequency converter) and differential gearing.

In this case, the average annual wind speed is the annual average of the wind speed measured at the hub height (corresponds to the center of the rotor). The maximum average annual wind speeds of 10.0 m/s, 8.5 m/s, 7.5 m/s and 6.0 m/s correspond to the so-called IEC type classes 1, 2, 3, and 4. A Rayleigh distribution is assumed to be the statistical frequency distribution on a standard basis.

A nominal speed range of −/+6% is the basis underlying the example that is necessary due to the minimum required control speed range in the nominal output range of wind power stations with differential drives, the nominal speed range meaning that rotor speed range that can be implemented with nominal speed of the differential drive. Moreover, a field attenuation range of up to 80% over the nominal speed of the differential drive is assumed. It is apparent from the graphic that for low average annual wind speeds, the optimum is reached at a nominal speed range of roughly −/+20%, and a widening of the nominal speed range, moreover, no longer entails advantages since the higher efficiency losses due to the larger differential drive cancel or surpass the efficiency gains due to the larger speed range. This optimum is shifted in the direction of −/+15% nominal speed range for higher average annual wind speeds.

Figure 7:
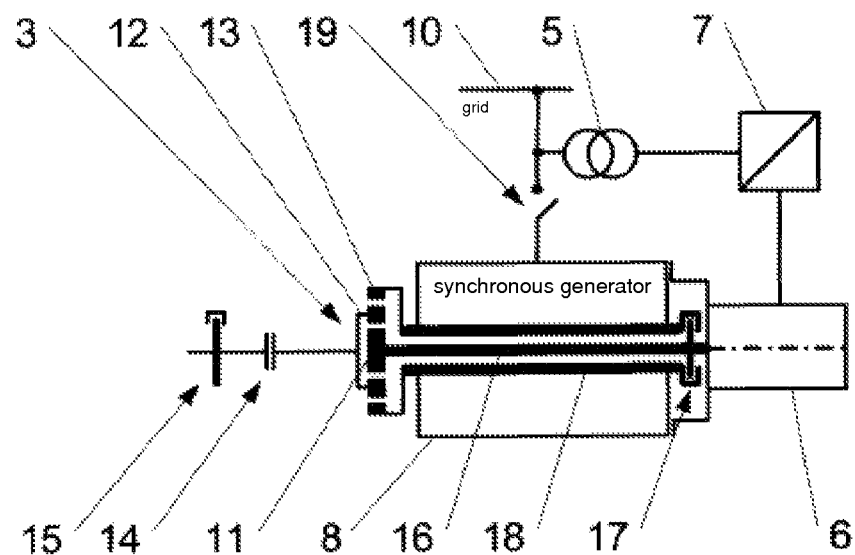
FIG. 7 shows one possible design according to the invention with a brake between the differential drive and rotor shaft of the synchronous generator.

FIG. 7 shows one embodiment of differential gearing according to the invention. A rotating brake 17 is added to the system, as described in principle in FIG. 3; as soon as it is activated, it connects in a torsionally strong manner the connecting shaft 16 of the differential drive 6 to the rotor shaft 18 of the synchronous generator 8. In the variant shown, the brake 17 consists of one or more brake saddles that are connected to the rotor shaft 18 of the synchronous generator 8 and one or more brake disks that are connected to the connecting shaft 16. Likewise, however, the brake saddles can be connected to the connecting shaft 16 or the brake disk(s) to the rotor shaft 18.

The rotor of the wind power station, for example, has a −/+ nominal speed range of 14%, as a result of which at fixed transmission of the differential gearing 3 of roughly −5 for the illustrated differential drive, a nominal speed is 1075 rpm. In standard operation of the wind power station—i.e., with the brake 17 not activated—and operation of the differential drive 6 with up to 80% field attenuation range, this allows a minimum speed of the rotor of the wind power station of 8.3 rpm (compare FIG. 4). At an engagement-wind speed of 3 m/s, a tip speed ratio of the rotor of roughly 19 is thus produced with a power coefficient of roughly 0.12. This means, however, a massive deterioration of the energy yield—compared to a maximum possible power coefficient of roughly 0.49.

If FIG. 5 is now examined in detail, it can be recognized that below a wind speed of 7 m/s, the speed on the drive shaft 16 reaches at most roughly 1,000 rpm, that is, roughly the nominal speed of the differential drive. This means that for a torsionally strong connection of the drive shaft 16 and the rotor shaft 18 of the synchronous generator 8 by the tightened brake 17, the differential drive 6 can be used as a generator that is connected to the grid 10 by means of converter 7 and transformer 5, with simultaneous separation of the synchronous generator from the grid—by means of, for example, the switch 19.

The differential drive is preferably a three-phase machine (for example, a standard asynchronous machine or an especially low-inertia, permanent magnet-excited synchronous machine) that in conjunction with a frequency converter 7 allows an application-specific large speed range (i.e., from speed equal to zero into the maximum field attenuation range—for example, 1.8 times nominal speed). Thus, the speed of the differential drive is set such that the optimum tip speed ratio on the rotor of the wind power station can be implemented.

Figure 8:
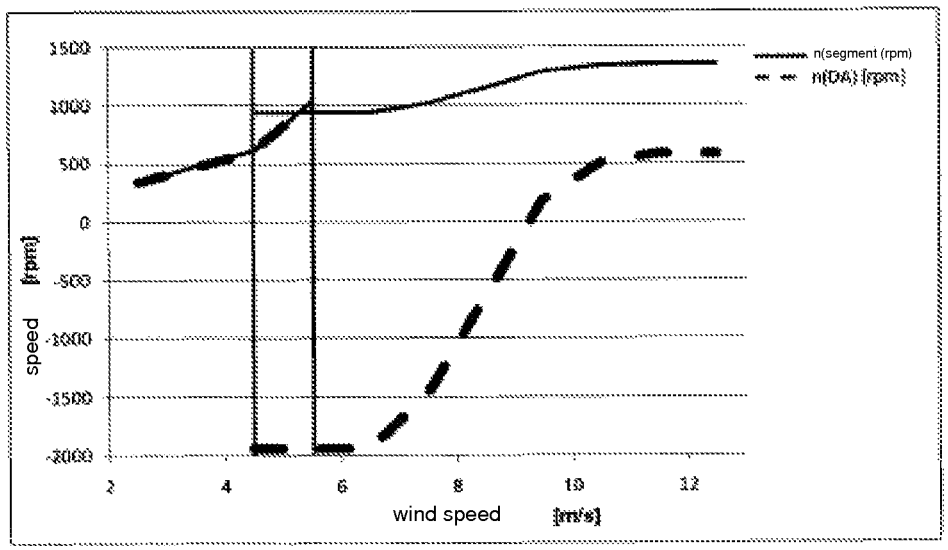
FIG. 8 shows the speed characteristics of the differential drive and drive shaft for the embodiment of differential gearing according to the invention.

By way of example, FIG. 8 shows characteristics of the two operating modes that overlap between an average wind speed of 4.5 m/s and 5.5 m/s (range identified by two vertical lines). As a result of the stochastic distribution of the wind speed, this hysteresis is necessary to avoid continuously switching back and forth between the two operating modes. That is to say, the larger this hysteresis, the less often is it necessary to switch from one operating mode into the other. Here, the operating mode "with differential drive 6 as generator" is limited by the nominal output of the differential drive 6. In the operating mode "synchronous generator 8 on the grid," the speed range is limited by the chosen −/+ nominal speed range or by the chosen field attenuation range of the differential drive 6. Another advantage is that in the range of low power output, the efficiency of the differential drive 6 is much better than that of the synchronous generator 8 that is many times larger.

This widening of the speed range of the rotor of the wind power station can increase the annual energy yield of the wind power station by up to 1.5%. Moreover, the −/+ nominal speed range of the rotor of the wind power station can be reduced to a minimum that is necessary in terms of control engineering since in the operating mode "differential drive 6 as generator," at low wind speeds the speed of the differential drive 6 can be optionally reduced without major limitations. Thus, the size of the differential drive is reduced to a cost optimum.

The switching process between the two operating modes can take place as follows. If the operating mode "differential drive 6 as generator" prevails and the intention is to switch to the second operating mode "synchronous generator 8 on the grid" due to rising average wind speed, first the output of the wind power station is adjusted to roughly zero by means of rotor blade adjustments, and in the next step, the brake 17 is released. Then, the synchronous generator 8 is synchronized with the grid by means of the differential drive 6. As soon as this has taken place, the switch 19 can be closed, with which the synchronous generator 8 is on the grid and subsequently the wind power station can again pass into production operation. This process lasts only a few seconds, and thus causes no noteworthy adverse effects with respect to the energy yield of the wind power station.

If the operating mode "synchronous generator 8 on the grid" prevails and the intention is to switch to the second operating mode "differential drive 6 as generator" due to falling average wind speed, first the output of the wind power station is also adjusted to roughly zero by means of rotor blade adjustment. Then, the synchronous generator 8 is simply disconnected from the grid by opening the switch 19, then the speed of the differential drive 6 is brought to roughly the speed of the rotor shaft 18 of the synchronous generator 8, and then the brake 17 is activated. Subsequently, the wind power station can again pass into production operation. Simple braking of the differential drive 6 is alternatively likewise possible, but it does cause a higher load on the brake 17.

Figure 9:
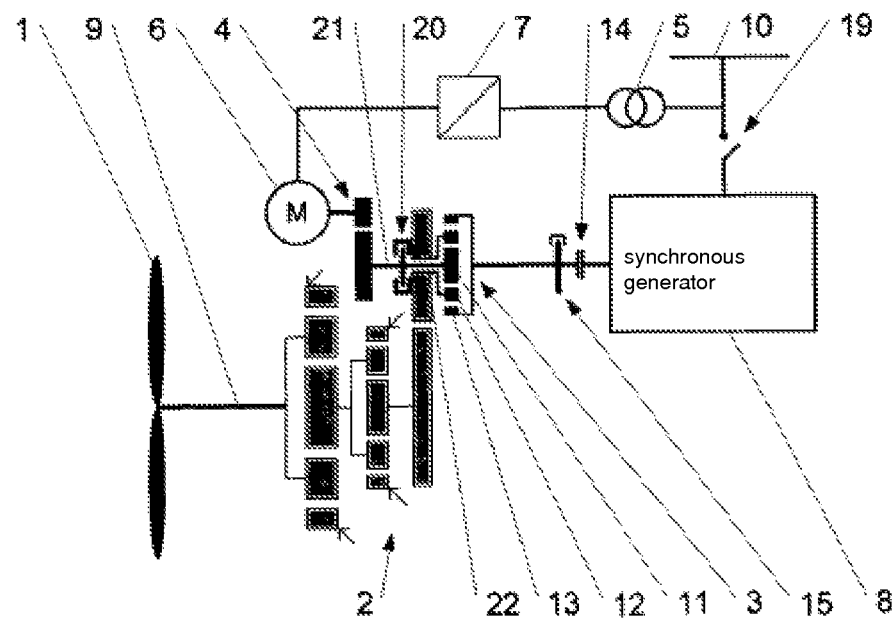
FIG. 9 shows one alternative embodiment of differential gearing with a brake between a first drive connected to the drive shaft of the energy generation plant, and the differential drive.

FIG. 9 shows one alternative embodiment of differential gearing with a detachable, torsionally strong connection. A brake 20 is implemented between the pinion shaft 21 and the gear wheel 22 of the spur gear stages of the main gearing 2, which gear wheel is connected to the planetary gear carrier 12 of the differential gearing 3, in the system as described in principle in FIG. 2. In the variant embodiment shown, the brake 20 consists of one or more brake saddles that are connected to the gear wheel 22, and one or more brake disks that are connected to the pinion shaft 21. This thus yields the same effect as for FIG. 7 for a brake 17 between the drive shaft 16 and rotor shaft 18 of the synchronous generator 8.

That is to say, this principle works as soon as any two shafts of the three drives or outputs of differential gearing are connected torsionally strong to one another, and thus the transmission of the differential gearing 3 is equal to 1. Of course, any other design is also conceivable with which the differential gearing 3 can be blocked, so that its transmission can be fixed at 1, such as, for example, with at least one blocked planetary gear of the planetary gear carrier 12.

Instead of the described brake for torsionally strong connection of any two shafts of the three drives or outputs of the differential gearing, for example, any type of clutch (for example, multiple-disk or jaw clutch) can also be used, when a jaw clutch, for example, is used, the synchronization of the shafts that are to be connected in a torsionally strong manner being comparatively more complicated than with, for example, a brake or a multiple-disk clutch.

In the design of differential drives, moreover, still other important special cases can be examined. Thus, for example, due to the constant ratio of rotor speed to speed on the differential drive, failure of the differential drive can entail serious damage. One example is the failure of the differential drive in nominal operation of the wind power station. For this reason, at the same time, the transferable torque on the drive line tends toward zero. The speed of the rotor of the wind power station in this case is suddenly reduced, for example, by prompt adjustment of the rotor blade adjustment system, and the generator is disconnected from the grid. Due to the relatively high mass inertia of the generator, it will change its speed only slowly. For this reason, if the differential drive cannot at least partially maintain its torque without delay, an overspeed of the differential drive is inevitable.

For this reason, for example, when hydrostatic differential drives are used, there is a mechanical brake that prevents damaging overspeeds for the drive line when the differential drive fails. WO2004/109157 A1 for this purpose shows a mechanical brake with housing-mounted brake saddles that acts directly on the generator shaft and thus can brake the generator accordingly.

Likewise, however, the brakes 17 and 20 can also be used to avoid a damaging overspeed. The maximum speed of the differential drive that is being established then corresponds to the maximum speed of the rotor of the wind power station multiplied by the transmission ratio of the main gearing 2; this is, for example, roughly 1,500 rpm in the described example according to FIG. 7. The brake 17 or 20 can be made as a so-called safety brake (so-called fail-safe brake) for safety reasons; this means that it is opened against spring force and is thus automatically activated when the supply energy fails.

The variant embodiments according to FIG. 7 and FIG. 9, however, differ essentially with respect to the effects of so-called emergency braking of the wind power station by means of the main brake 15. If it is assumed that when the main brake 15 is activated, a braking torque of up to 2.5 times the nominal torque conventionally acts, it acts divided on the rotor, generator and differential drive according to the reduced mass moments of inertia thereof. They are, of course, dependent on the mass ratios of the cited wind power station. One realistic example can be roughly 1,900 kgm$^2$ for the rotor 1, roughly 200 kgm$^2$ for the synchronous generator 8, and roughly 10 kgm$^2$ for the differential drive 6 in nominal operation of a 5 MW wind power station relative to the main brake 15. This means that a large part (roughly 90% or 2.2 times rotor nominal torque) of the braking torque acts on the rotor shaft of the wind power station. Since at this point in the variant embodiment according to FIG. 9, the differential drive 6 is in the torque flow between the main brake 15 and rotor 1, the latter, corresponding to the constant torque ratios between rotor 1 and differential drive 6, must likewise bear the roughly 2.2 times nominal torque. The same applies, however, also to the design torque of the brake 20.

One major advantage of the variant embodiment according to FIG. 7 is that when the main brake 15 is applied, its braking torque does not act via the differential gearing 3 on the rotor 1 that determines the mass moment of inertia. In this case, only roughly 9.5% of the braking torque acts on the generator 8 or roughly 0.5% on the differential drive 6. Therefore, a design torque of the brake 17 over the torque of the differential drive 6 prevailing in operation is not necessary due to the arrangement of the main brake 15, rotor 1, and differential gearing 3 shown in FIG. 7.

Since a device for limiting the maximum occurring speed of the differential drive 6 is critical, the described device yields a major widening of the speed range and thus a considerable increase of the annual energy yield, without added costs.

The aforementioned embodiments can likewise be implemented in technically similar applications. This applies to, among others, hydroelectric plants for use of river and ocean flows. For this application, the same basic prerequisites as for wind power stations apply, specifically variable flow speed. The drive shaft in these cases is driven directly or indirectly by the devices driven by the flow medium, for example water. Subsequently, the drive shaft directly or indirectly drives the differential gearing.

The invention claimed is:

1. A differential gearing for an energy generation plant, the energy generation plant being a wind power station, the gearing comprising:
   three drives and outputs, a first drive being connected to a drive shaft of the energy generation plant, one output being connected to a first generator that can be connected to a grid, and a second drive being connected to an electrical machine as a differential drive
   wherein differential gearing is configured to fix the transmission ratio of the differential gearing at 1, and the first generator is configured to be disconnected from the grid, and
   the differential drive is operated as a second generator while the first generator is disconnected from the grid.

2. The differential gearing according to claim 1, wherein one drive is configured to be connected torsionally strong to the other drive or to one of the outputs.

3. The differential gearing according to claim 2, further comprising a pinion configured to be connected torsionally strong to a planetary gear carrier.

4. The differential gearing according to claim 2, further comprising a pinion configured to be connected torsionally strong to a ring gear.

5. The differential gearing according to claim 2, further comprising a ring gear configured to be connected torsionally strong to a planetary gear carrier.

6. The differential gearing according to claim 2, wherein the torsionally strong connection has a brake or coupling.

7. The differential gearing according to claim 2, wherein the torsionally strong connection is constructed and arranged to operate as a device that prevents an overspeed of the differential drive and/or of the differential gearing.

8. The differential gearing according to claim 1, further comprising a planetary gear carrier, wherein a planetary gear of the planetary gear carrier can be blocked by a blocking device.

9. The differential gearing according to claim 8, wherein the blocking device is a brake or coupling.

10. The differential gearing according to claim 8, wherein the blocking device is constructed and arranged to operate as a device for preventing an overspeed of the differential drive and/or of the differential gearing.

11. The differential gearing according to claim 1, wherein the differential gearing is a single-stage planetary gearing.

12. The differential gearing according to claim 1, wherein the differential gearing is multistage gearing.

13. The differential gearing according to claim 1, wherein a main brake acts on the first drive.

14. The differential gearing according to claim 1, wherein the electrical machine can be operated in a field attenuation range, the electrical machine being operated at least temporarily in a field attenuation range of at least 50%.

15. The differential gearing according to claim 1, wherein the first drive connected to the drive shaft turns with a base speed, and
   the speed range of the first drive is at least −/+6.0% and at most −/+20.0% of the base speed, while the electrical machine is operated with nominal speed.

16. The differential gearing according to claim 15, wherein the speed range is at most −/+14.0% of the base speed.

17. A method for operating differential gearing for an energy generation plant, the energy generation plant being a wind power station, having three drives and outputs, a first drive being connected to a drive shaft of the energy generation plant, one output being connected to a generator that can be connected to a grid, and a second drive being connected to an electrical machine that is a differential drive, the method comprising:
   switching from one operating mode in which both the generator and the differential drive are connected to the grid into another operating mode in which the generator is disconnected from the grid and the differential drive is connected to the grid, the switching into the other operating mode comprising
   adjusting the output of the energy generation plant to zero,
   disconnecting the generator from the grid after the adjusting the output to zero,
   bringing the speed of the differential drive to the speed of the rotor shaft of the generator after the disconnecting the generator,
   fixing a transmission ratio of the differential gearing at 1 after bringing the speed of the differential drive to the speed of the rotor shaft, and
   increasing the output of the energy generation plant again.

18. A method for operating differential gearing for an energy generation plant, the energy generation plant being a wind power station, having three drives and outputs, a first drive being connected to a drive shaft of the energy generation plant, one of the outputs being connected to a generator that can be connected to a grid, and a second drive being connected to an electrical machine that is a differential drive, the method comprising:
   switching from one operating mode in which the generator is disconnected from the grid, the differential drive is connected to the grid, and a transmission ratio of the differential gearing is fixed at 1, into another operating mode in which both the generator and the differential drive are connected to the grid, the switching to the other operating mode comprising
   adjusting the one output of the energy generation plant to zero,
   cancelling the fixing of the transmission ratio of the differential gearing to 1 after the adjusting the output to zero,
   synchronizing the generator to the grid by the differential drive after the cancelling the fixing of the transmission ratio,
   connecting the generator to the grid after the synchronizing the generator, and
   increasing the output of the energy generation plant again.

19. Differential gearing according to claim 3, wherein the torsionally strong connection has a brake (17, 20) or coupling.

* * * * *